US012763676B2

(12) United States Patent
Ma et al.

(10) Patent No.: US 12,763,676 B2
(45) Date of Patent: Oct. 13, 2026

(54) SWITCHING POWER CONVERTER AND CONTROL METHOD THEREOF FOR SUPPRESSING RADIATED ELECTROMAGNETIC INTEREFERENCE AND IMPROVING EFFICIENCY

(71) Applicant: Delta Electronics (Shanghai) Co., Ltd., Shanghai (CN)

(72) Inventors: Kehua Ma, Shanghai (CN); Daofei Xu, Shanghai (CN); Haitao Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 234 days.

(21) Appl. No.: 18/532,718

(22) Filed: Dec. 7, 2023

(65) Prior Publication Data

US 2024/0195318 A1 Jun. 13, 2024

(30) Foreign Application Priority Data

Dec. 9, 2022 (CN) ......................... 202211583666.5

(51) Int. Cl.
*H02M 1/44* (2007.01)
*H02M 1/00* (2007.01)
*H02M 3/156* (2006.01)
*H02M 3/335* (2006.01)

(52) U.S. Cl.
CPC ........... *H02M 1/44* (2013.01); *H02M 1/0032* (2021.05); *H02M 3/156* (2013.01); *H02M 3/335* (2013.01)

(58) Field of Classification Search
CPC . H02M 1/0032; H02M 1/0035; H02M 3/1566
See application file for complete search history.

(56) References Cited

U.S. PATENT DOCUMENTS 6,051,961 A * 4/2000 Jang .................... H02M 1/4208 323/224
7,106,603 B1 * 9/2006 Lin .................. H02M 3/33507 363/21.16

(Continued)

FOREIGN PATENT DOCUMENTS

CN 104300795 B 8/2017
CN 111030462 B 6/2021
CN 112491258 B 3/2022

*Primary Examiner* — Gustavo A Rosario-Benitez
(74) *Attorney, Agent, or Firm* — KIRTON McCONKIE; Evan R. Witt

(57) ABSTRACT

A switching power converter and a control method thereof are provided. First, a switching power converter is provided. The switching power converter includes a main switch and an auxiliary circuit electrically connected in parallel to the main switch, and the auxiliary circuit includes an auxiliary switch and an auxiliary capacitor electrically connected in series. Afterwards, a load state of the switching power converter is detected. When the load state of the switching power converter is light, the auxiliary switch is controlled to turn off for maintaining a capacitance of a first equivalent capacitor between a drain and a source of the main switch at a low threshold. When the load state of the switching power converter is heavy, the auxiliary switch is controlled to turn on for maintaining the capacitance of the first equivalent capacitor at a high threshold.

5 Claims, 8 Drawing Sheets

(56) References Cited

U.S. PATENT DOCUMENTS

| | | | | |
|---|---|---|---|---|
| 2009/0073725 | A1* | 3/2009 | Lin | H02M 3/33523 363/19 |
| 2015/0097600 | A1* | 4/2015 | Young | H02M 3/33569 327/109 |
| 2015/0162773 | A1* | 6/2015 | Wang | H01C 1/16 363/21.16 |
| 2017/0005585 | A1* | 1/2017 | Shimura | G03G 15/80 |
| 2017/0264206 | A1* | 9/2017 | Rana | H02M 3/33569 |
| 2018/0226895 | A1* | 8/2018 | Song | H02M 1/34 |
| 2019/0207522 | A1* | 7/2019 | Sato | H02M 3/33523 |
| 2019/0245453 | A1* | 8/2019 | Radic | H02M 3/33592 |
| 2021/0021199 | A1* | 1/2021 | Liu | H02M 3/33569 |

* cited by examiner

SWITCHING POWER CONVERTER AND CONTROL METHOD THEREOF FOR SUPPRESSING RADIATED ELECTROMAGNETIC INTEREFERENCE AND IMPROVING EFFICIENCY

CROSS REFERENCE

This application claims priority to China Patent Application No. 202211583666.5, filed on Dec. 9, 2022, the entire contents of which are incorporated herein by reference for all purposes.

TECHNICAL FIELD

The present disclosure relates to the field of power supplies, and more particularly to a switching power converter and a control method thereof.

BACKGROUND

Typically, conventional power supplies include four voltage settings. For example, a 65 W type-C PD3.0 power supply contains four voltage settings: 5V/3 A, 9V/3 A, 15V/3 A, and 20V/3.25 A. According to DOE Level VI regulations, each voltage setting should meet the corresponding average efficiency requirements. In specific, the power supply with the voltage setting of 5V/3 A should achieve an average efficiency of 81.39%, the power supply with the voltage setting of 9V/3 A should achieve an average efficiency of 86.62%, the power supply with the voltage setting of 15V/3 A should achieve an average efficiency of 87.73%, and the power supply with the voltage setting of 20V/3.25 A should achieve an average efficiency of 88%.

For the 65 W type-C PD3.0 power supply, the quasi-resonant flyback converter (a kind of the switching power converters), which has a wide range of output voltage and low cost, is preferred. However, when the quasi-resonant flyback converter works under heavy load, the high-speed operation of the transistor in the quasi-resonant flyback converter may easily cause radiated electromagnetic interference. The conventional quasi-resonant flyback converter suppresses the radiated electromagnetic interference through disposing a capacitor electrically connected in parallel to the transistor, nevertheless, the capacitor would increase the overall capacitance of the capacitors connected in parallel to the transistor, resulting in high switching loss and low average efficiency of the quasi-resonant flyback converter operating at light load (e.g., 5V or 9V).

Therefore, there is a need of providing a switching power converter and a control method thereof in order to overcome the drawbacks of the conventional technologies.

SUMMARY

The present disclosure provides a switching power converter including a main switch and an auxiliary circuit. The auxiliary circuit includes an auxiliary switch and an auxiliary capacitor. When the load state of the switching power converter is light, a control module controls the auxiliary switch to turn off, so as to maintain a capacitance of a first equivalent capacitor between a drain and a source of the main switch at a low threshold. When the load state of the switching power converter is heavy, the control module controls the auxiliary switch to turn on, so as to maintain the capacitance of the first equivalent capacitor between the drain and source of the main switch at a high threshold. In the present disclosure, the switching power converter suppresses the radiated electromagnetic interference through disposing the auxiliary capacitor when the switching power converter is under heavy load. When the switching power converter works under light load, the auxiliary switch is turned off to reduce the capacitance of the first equivalent capacitor between the drain and source of the main switch. When the switching power converter works under light load, the capacitance of the first equivalent capacitor is only a sum of the capacitances of a first parasitic capacitor and a second parasitic capacitor, which is much smaller than the capacitance of the auxiliary capacitor. Therefore, for the overall switching power converter, the average efficiency is improved, and the losses are reduced. In other words, the switching power converter of the present disclosure realizes the technical effects of suppressing the radiated electromagnetic interference and improving the average efficiency.

In accordance with an aspect of the present disclosure, a switching power converter is provided. The switching power converter includes a main switch, an auxiliary circuit and a control module. The auxiliary circuit is electrically connected in parallel to the main switch, the auxiliary circuit includes an auxiliary switch and an auxiliary capacitor, and the auxiliary switch and the auxiliary capacitor are electrically connected in series. The control module is configured to detect a load state of the switching power converter and control an operation state of the auxiliary switch according to the load state. When the load state of the switching power converter is light, the control module controls the auxiliary switch to turn off so that a capacitance of a first equivalent capacitor between a drain and a source of the main switch is maintained at a first threshold. When the load state of the switching power converter is heavy, the control module controls the auxiliary switch to turn on so that the capacitance of the first equivalent capacitor is maintained at a second threshold, and the second threshold is higher than the first threshold.

In accordance with another aspect of the present disclosure, a control method of a switching power converter is provided. In the control method, firstly, a switching power converter including a main switch and an auxiliary circuit are provided. The auxiliary circuit is electrically connected in parallel to the main switch, the auxiliary circuit includes an auxiliary switch and an auxiliary capacitor, and the auxiliary switch and the auxiliary capacitor are electrically connected in series. Then, a load state of the switching power converter is detected. When the load state of the switching power converter is light, the auxiliary switch is controlled to turn off for maintaining a capacitance of a first equivalent capacitor between a drain and a source of the main switch at a first threshold. When the load state of the switching power converter is heavy, the auxiliary switch is controlled to turn on for maintaining the capacitance of the first equivalent capacitor at a second threshold, and the second threshold is higher than the first threshold.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
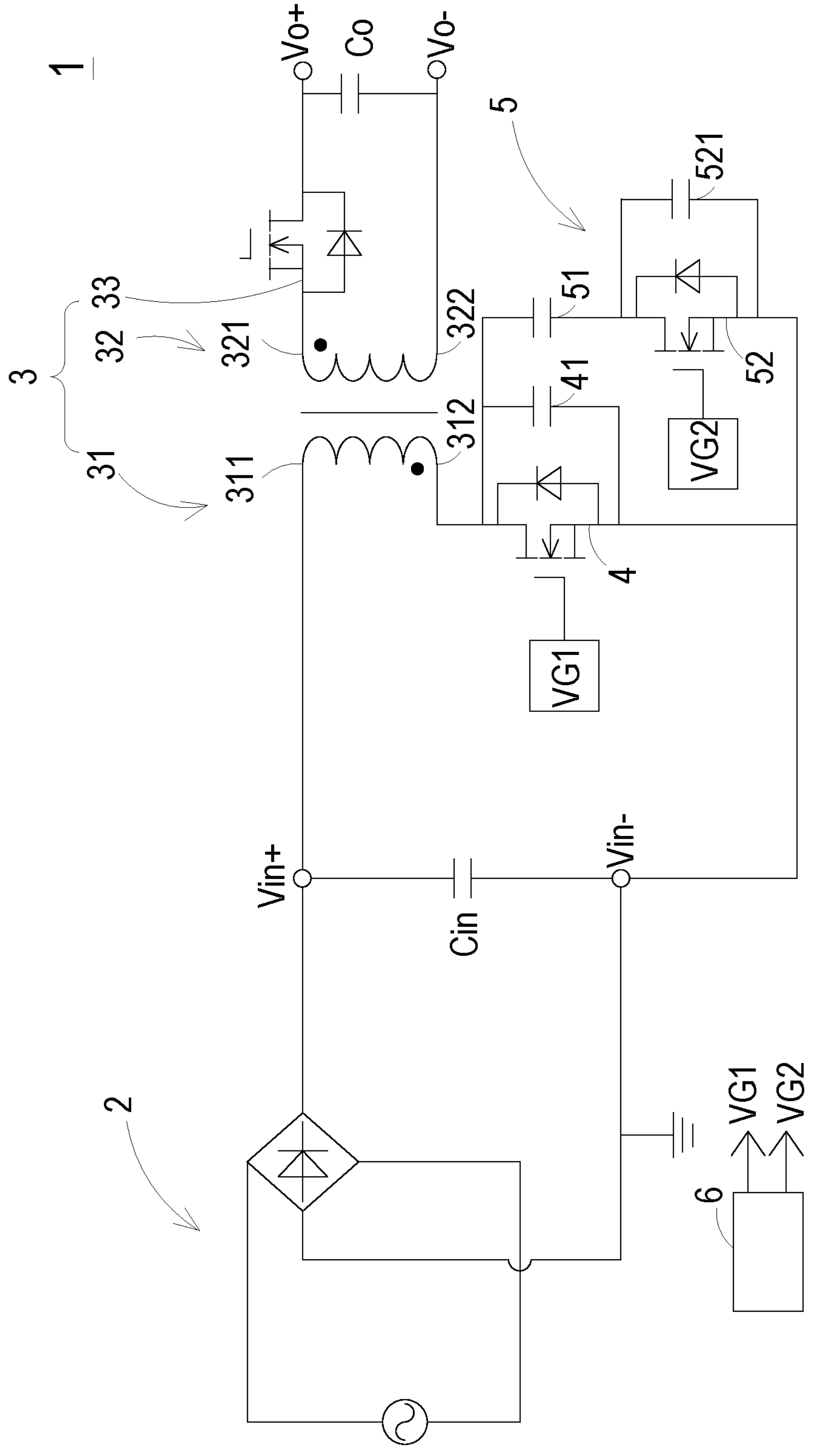
FIG. 1 is a schematic circuit diagram illustrating a switching power converter according to a first embodiment of the present disclosure.

Please refer to FIG. 1. FIG. 1 is a schematic circuit diagram illustrating a switching power converter according to a first embodiment of the present disclosure. As shown in FIG. 1, the switching power converter 1 in this embodiment is formed by a flyback conversion circuit. The switching power converter 1 receives an input power provided by an external power source 2, converts the input power into an output power, and outputs the output power to a load (not shown). The voltage range of the input power is between 90-264 Vac, and the output power may have four kinds of voltage settings including 5V/3 A, 9V/3 A, 15V/3 A and 20V/6.75 A. The switching power converter 1 includes a positive input terminal Vin+, a negative input terminal Vin−, a positive output terminal Vo+, a negative output terminal Vo−, an input capacitor Cin, an output capacitor Co, a transformer 3, a main switch 4, an auxiliary circuit 5, and a control module 6. The switching power converter 1 receives the input power provided by the external power source 2 through the positive input terminal Vin+ and the negative input terminal Vin−, and outputs the output power to the load through the positive output terminal Vo+ and the negative output terminal Vo−. The input capacitor Cin is electrically connected between the positive input terminal Vin+ and the negative input terminal Vin−. The output capacitor Co is electrically connected between the positive output terminal Vo+ and the negative output terminal Vo−.

The transformer 3 includes a primary winding 31, a secondary winding 32 and a secondary switch 33, and the main inductance of transformer 3 may be 340 uH. The primary winding 31 and secondary winding 32 are coupled to each other. The primary winding 31 has a first terminal 311 and a second terminal 312, and the first terminal 311 of the primary winding 31 is electrically connected to the positive input terminal Vin+. The secondary winding 32 has a first terminal 321 and a second terminal 322. The first terminal 321 of the secondary winding 32 is electrically connected to the positive output terminal Vo+ through the secondary switch 33, and the second terminal 322 of the secondary winding 32 is electrically connected to the negative output terminal Vo−. The first terminal 321 of the secondary winding 32 and the second terminal 312 of the primary winding 31 are dotted terminals. In this embodiment, the turns ratio of the primary winding 31 and the secondary winding 32 may be 24:4. The main switch 4 is electrically connected between the second terminal 312 of primary winding 31 of transformer 3 and the negative input terminal Vin−. The main switch 4 has a first parasitic capacitor 41 which is determined by the main switch 4 itself and has a capacitance range of 85-600 pF. The auxiliary circuit 5 is electrically connected in parallel to the main switch 4, and the auxiliary circuit 5 includes an auxiliary capacitor 51 and an auxiliary switch 52. The auxiliary capacitor 51 is electrically connected to the second terminal 312 of the primary winding 31, and the auxiliary switch 52 is electrically connected between the auxiliary capacitor 51 and the negative input terminal Vin−. In other words, the auxiliary capacitor 51 and the auxiliary switch 52 are electrically connected in series between the second terminal 312 of the primary winding 31 and the negative input terminal Vin−. The capacitance range of the auxiliary capacitor 51 may be 100-220 pF, and capacitors with different capacitances may be selected according to actual requirements. The auxiliary switch 52 has a second parasitic capacitor 521 which is determined by the auxiliary switch 52 itself, and the second parasitic capacitor 521 has a capacitance less than 30 pF preferably. In an embodiment, the unit of the turn-on impedance of the main switch 4 is milliohm, for example, the turn-on impedance of the main switch 4 is 125 milliohms when the input voltage is 600V. The unit of the turn-on impedance of the auxiliary switch 52 is ohm, for example, the turn-on impedance of the auxiliary switch 52 is 3.4 ohms when the input voltage is 600V. In an embodiment, the capacitance of the first parasitic capacitor 41 is greater than or equal to the capacitance of the second parasitic capacitor 521, and the capacitance of the auxiliary capacitor 51 is greater than or equal to the capacitance of the second parasitic capacitor 521.

The control module 6 is electrically connected to the main switch 4, the auxiliary switch 52, the positive output terminal Vo+ and the negative output terminal Vo−. The control module 6 controls the operation state of the auxiliary switch 52 according to the load state between the positive output terminal Vo+ and the negative output terminal Vo− of the switching power converter 1. When the control module 6 determines that the load state is light, the control module 6 controls the auxiliary switch 52 to turn off, and the main switch 4 turns on or off according to the working cycle. Accordingly, the capacitance of the first equivalent capacitor between the drain and source of the main switch 4 is maintained at a low threshold. When the auxiliary switch 52 turns off, the auxiliary capacitor 51 and the second parasitic capacitor 521 are electrically connected in series. Since the capacitance of the second parasitic capacitor 521 is much smaller than the capacitance of the auxiliary capacitor 51, the capacitance of the auxiliary capacitor 51 can be ignored. Therefore, under this circumstance, the capacitance of the first equivalent capacitor is the sum of the capacitance of the first parasitic capacitor 41 and the capacitance of the second parasitic capacitor 521. When the control module 6 determines that the load state is heavy, the control module 6 controls the auxiliary switch 52 to turn on, and the main switch 4 turns on or off according to the working cycle.

Accordingly, the capacitance of the first equivalent capacitor between the drain and source of the main switch 4 is maintained at a high threshold. When the auxiliary switch 52 turns on, the capacitance of the second parasitic capacitor 521 can be ignored, and the capacitance of the first equivalent capacitor is the sum of the capacitance of the first parasitic capacitor 41 and the capacitance of the auxiliary capacitor 51. In some embodiments, the switching power converter 1 further includes a power factor correction circuit (not shown) electrically connected between the external power source 2 and the input capacitor Cin.

Figure 2:
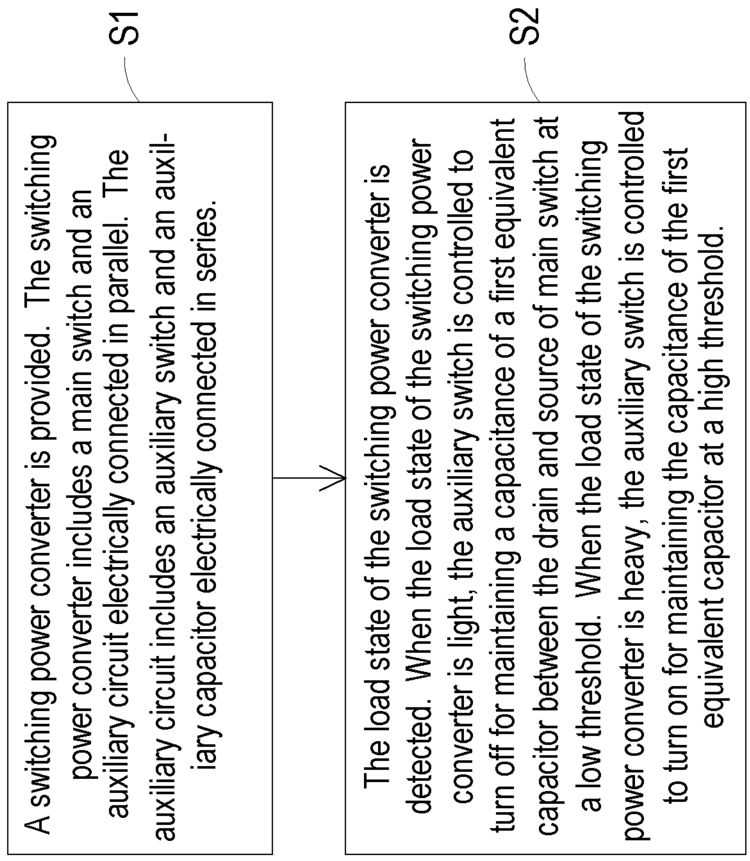
FIG. 2 is a schematic flow chart illustrating a control method of the switching power converter of the present disclosure.

Please refer to FIG. 2. FIG. 2 is a schematic flow chart illustrating a control method of the switching power converter of the present disclosure. As shown in FIG. 2, firstly, in the step S1, a switching power converter 1 is provided. The switching power converter 1 includes a main switch 4 and an auxiliary circuit 5, and the auxiliary circuit 5 is electrically connected in parallel to the main switch 4. The auxiliary circuit 5 includes an auxiliary switch 52 and an auxiliary capacitor 51, and the auxiliary switch 52 and the auxiliary capacitor 51 are electrically connected in series. Afterwards, in the step S2, the load state of the switching power converter 1 is detected, when the load state of the switching power converter 1 is light, the auxiliary switch 52 is controlled to turn off for maintaining the capacitance of the first equivalent capacitor between the drain and source of main switch 4 at a low threshold, and when the load state of the switching power converter 1 is heavy, the auxiliary switch 52 is controlled to turn on for maintaining the capacitance of the first equivalent capacitor between the drain and source of main switch 4 at a high threshold.

From the above descriptions, the switching power converter 1 of the present disclosure includes a main switch 4 and an auxiliary circuit 5, and the auxiliary circuit 5 includes an auxiliary switch 52 and an auxiliary capacitor 51. When the load state of the switching power converter 1 is light, the control module 6 controls the auxiliary switch 52 to turn off, so as to maintain the capacitance of the first equivalent capacitor between the drain and source of main switch 4 at a low threshold. When the load state of the switching power converter 1 is heavy, the control module 6 controls the auxiliary switch 52 to turn on, so as to maintain the capacitance of the first equivalent capacitor between the drain and source of main switch 4 at a high threshold. Compared with the conventional quasi-resonant flyback converter, the switching power converter 1 of the present disclosure suppresses the radiated electromagnetic interference under heavy load through disposing the auxiliary capacitor 51. When the switching power converter 1 works under light load, the auxiliary switch 52 is turned off to reduce the capacitance of the first equivalent capacitor between the drain and source of main switch 4. When the switching power converter 1 works under light load, the capacitance of the first equivalent capacitor is only the sum of the capacitances of first parasitic capacitor 41 and the capacitances of second parasitic capacitor 521, which is much smaller than the capacitance of the auxiliary capacitor 51. Therefore, for the overall switching power converter 1, the average efficiency is improved, and the losses are reduced. In other words, the switching power converter 1 of the present disclosure realizes the technical effects of suppressing the radiated electromagnetic interference and improving the average efficiency at the same time.

Figure 3:
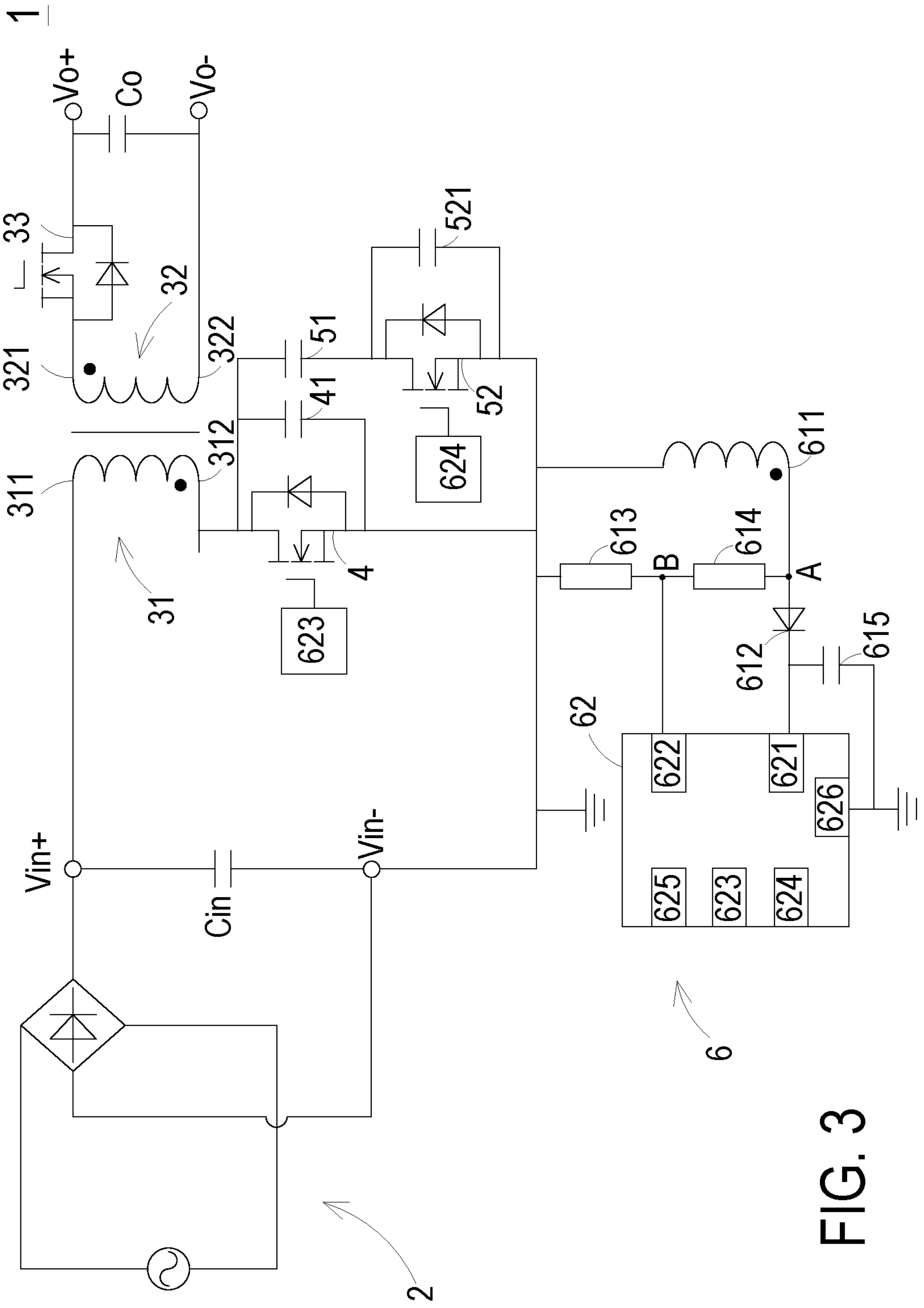
FIG. 3 is a schematic circuit diagram showing the detailed circuit structure of the switching power converter and the control module thereof in FIG. 1.

The switching power converter 1 utilizes the control module 6 to detect the output voltage and to control the operation state of the auxiliary switch 52. The detailed circuit structure and control method of the control module 6 would be described as follows. Please refer to FIG. 3. FIG. 3 is a schematic circuit diagram showing the detailed circuit structure of the switching power converter and the control module thereof in FIG. 1. As shown in FIG. 3, the control module 6 includes a control unit 62, an auxiliary winding 611, an auxiliary diode 612, a first divider resistor 613, a second divider resistor 614 and an auxiliary capacitor 615. A first terminal of the auxiliary winding 611 is electrically connected to the negative input terminal Vin−. In this embodiment, the turns ratio of the primary winding 31, the secondary winding 32 and the auxiliary winding 611 may be 24:4:10. An anode of the auxiliary diode 612 is electrically connected to a second terminal of the auxiliary winding 611, and a first branch connection node A connecting the auxiliary winding 611 and the anode of the auxiliary diode 612 is formed. The first divider resistor 613 and the second divider resistor 614 are electrically connected in series between the negative input terminal Vin- and the first branch connection node A. A second branch connection node B connecting the first divider resistor 613 and the second divider resistor 614 is formed. The resistance of the first divider resistor 613 is smaller than the resistance of the second divider resistor 614. For example, the ratio of the resistances of first divider resistor 613 and the second divider resistor 614 may be 1:15. A first terminal of the auxiliary capacitor 615 is electrically connected to a cathode of the auxiliary diode 612, and a second terminal of the auxiliary capacitor 615 is grounded. The control unit 62 includes an output voltage port 621, an auxiliary voltage port 622, a main switch control port 623, an auxiliary switch control port 624, a feedback signal port 625 and a ground port 626. The control unit 62 reflects information of the output voltage between the positive output terminal Vo+ and the negative output terminal Vo− through the output voltage port 621. The cathode of the auxiliary diode 612 is electrically connected to the output voltage port 621. The control unit 62 reflects information of the voltage across the auxiliary winding 611 through the auxiliary voltage port 622. The second branch connection node B between the first divider resistor 613 and the second divider resistor 614 is connected to the auxiliary voltage port 622. The main switch control port 623 is electrically connected to the main switch 4, and the control unit 62 controls the operation state of the main switch 4 through the main switch control port 623. The feedback signal port 625 is electrically connected to the secondary winding 32, and the control unit 62 receives a feedback signal provided by the secondary winding 32 through the feedback signal port 625. The auxiliary switch control port 624 is electrically connected to the auxiliary switch 52, and the control unit 62 controls the operation state of the auxiliary switch 52 through the auxiliary switch control port 624. The control unit 62 is grounded through the ground port 626.

In this embodiment, the output voltage of the switching power converter 1 may be 5V, 9V, 15V or 20V. The output voltage of 5V or 9V is assumed to be at low voltage level, which means that the load state of switching power converter 1 is light. The output voltage of 15V or 20V is assumed to be at high voltage level, which means that the load state of switching power converter 1 is heavy. Since the turns ratio of the secondary winding 32 and the auxiliary winding 611 of switching power converter 1 in this embodiment is 4:10, the voltage across the auxiliary winding 611 is 12.5V, 22.5V, 37.5V or 50V when the output voltage is 5V, 9V, 15V or 20V, respectively. Moreover, since the ratio of the resistances of the first divider resistor 613 and the second divider resistor 614 is 1:15, the voltage reflected by the auxiliary voltage port 622 is 0.833V, 1.5V, 2.5V or 3.33V when the voltage across the auxiliary winding 611 is 12.5V, 22.5V, 37.5V or 50V, respectively. In this embodiment, the control unit 62 has a preset first voltage threshold (e.g., 2V). When the voltage reflected by the auxiliary voltage port 622 is greater than or equal to the first voltage threshold (e.g., the voltage reflected by the auxiliary voltage port 622 is 2.5V or 3.33V, and the output voltage is 15V or 20V correspondingly), the load state of switching power converter 1 is heavy, and the control unit 62 controls the auxiliary switch 52 to turn on through the auxiliary switch control port 624. When the voltage reflected by the auxiliary voltage port 622 is less than the first voltage threshold (e.g., the voltage reflected by the auxiliary voltage port 622 is 0.833V or 1.5V, and the output voltage is 5V or 9V correspondingly), the load state of switching power converter 1 is light, and the control unit 62 controls the auxiliary switch 52 to turn off through the auxiliary switch control port 624.

In an embodiment, for the control unit 62 of the control module 6, there is no need to convert the voltage across the auxiliary winding 611 into a smaller voltage through the divider circuit, the control unit 62 may determine the load state of switching power converter 1 according to the voltage across the auxiliary winding 611 directly, and the control unit 62 control the operation state of the auxiliary switch 52 accordingly. For example, the output voltage of the switching power converter 1 may be 5V, 9V, 15V or 20V, the output voltage of 5V or 9V is assumed to be at low voltage level, which means that the load state of switching power converter 1 is light, and the output voltage of 15V or 20V is assumed to be at high voltage level, which means that the load state of switching power converter 1 is heavy. Since the turns ratio of the secondary winding 32 and the auxiliary winding 611 of switching power converter 1 in this embodiment is 4:10, the voltage across the auxiliary winding 611 is 12.5V, 22.5V, 37.5V or 50V when the output voltage is 5V, 9V, 15V or 20V, respectively. In this embodiment, the control unit 62 has a preset second voltage threshold and a preset third voltage threshold. As an example, the second voltage threshold is 32V, and the third voltage threshold is 28V, when the voltage across the auxiliary winding 611 is greater than or equal to the second voltage threshold (e.g., the voltage across the auxiliary winding 611 is 37.5V or 50V, and the output voltage is 15V or 20V correspondingly), the load state of switching power converter 1 is heavy, and the control unit 62 controls the auxiliary switch 52 to turn on through the auxiliary switch control port 624. When the voltage across the auxiliary winding 611 is less than the third voltage threshold (e.g., the voltage across the auxiliary winding 611 is 12.5V or 22.5V, and the output voltage is 5V or 9V correspondingly), the load state of switching power converter 1 is light, and the control unit 62 controls the auxiliary switch 52 to turn off through the auxiliary switch control port 624. In this embodiment, the second voltage threshold is different from the third voltage threshold (e.g., by 4V in the above example), thus the voltage across the auxiliary winding 611 would not frequently fluctuate between exceeding and falling below a threshold, thereby avoiding frequently switching the auxiliary switch 52. In another embodiment, the control unit 62 of the control module 6 may determine whether the load state of switching power converter 1 according to the output voltage directly and control the operation state of the auxiliary switch 52 accordingly. The control method is similar to that exemplified in above embodiments, and thus the detailed descriptions thereof are omitted herein.

Figure 4:
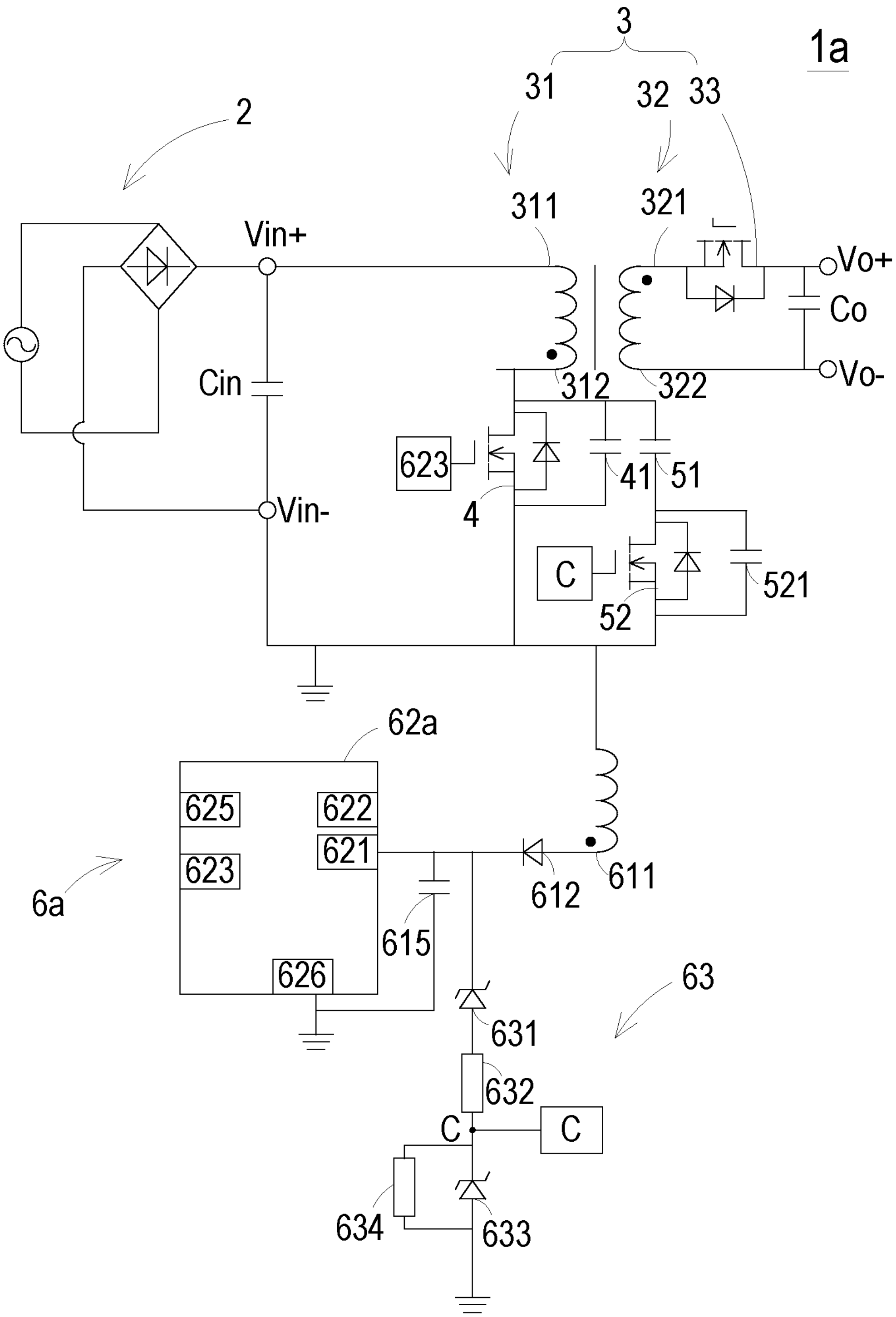
FIG. 4 is a schematic circuit diagram illustrating a switching power converter according to a second embodiment ofthe present disclosure.

Please refer to FIG. 4. FIG. 4 is a schematic circuit diagram illustrating a switching power converter according to a second embodiment of the present disclosure. As shown in FIG. 4, in this embodiment, the control module 6*a* of the switching power converter 1*a* includes a control unit 62*a*, an auxiliary winding 611, an auxiliary diode 612, an auxiliary capacitor 615 and an extended branch circuit 63. The auxiliary winding 611, auxiliary diode 612, and auxiliary capacitor 615 of the control module 6*a* in this embodiment are similar to that shown in FIG. 3, and thus the detailed descriptions are omitted herein. Compared with the control unit 62 of the control module 6 shown in FIG. 3, the control unit 62*a* of the control module 6*a* in this embodiment includes an output voltage port 621, an auxiliary voltage port 622, a main switch control port 623, a feedback signal port 625 and a ground port 626, and the control unit 62*a* doesn't include an auxiliary switch control port. The control module 6*a* in this embodiment utilizes the voltage provided by the extended branch circuit 63 to control the operation state of the auxiliary switch 52, and the circuit structure and control method of the extended branch circuit 63 are described as follows.

In this embodiment, the extended branch circuit 63 of the control module 6*a* includes a first Zener diode 631, a first extended resistor 632, a second Zener diode 633 and a second extended resistor 634. The first Zener diode 631, the first extended resistor 632 and the second Zener diode 633 are electrically connected in series between the output voltage port 621 and the negative input terminal Vin− sequentially. The second extended resistor 634 is electrically connected in parallel to the second Zener diode 633. As shown in FIG. 4, a third branch connection node C connecting the first extended resistor 632 and the second Zener diode 633 is formed, and the third branch connection node C is connected to the auxiliary switch 52. The auxiliary switch 52 is turned on or off according to the voltage of the third branch connection node C. In this embodiment, the output voltage of the switching power converter 1*a* may be 5V, 9V, 15V or 20V, the output voltage of 5V or 9V is assumed to be at low voltage level, which means that the load state of switching power converter 1*a* is light, and the output voltage of 15V or 20V is assumed to be at high voltage level, which means that the load state of switching power converter 1*a* is heavy. Since the turns ratio of the secondary winding 32 and the auxiliary winding 611 of switching power converter 1*a* in this embodiment is 4:10, the voltage across the auxiliary winding 611 is 12.5V, 22.5V, 37.5V or 50V when the output voltage is 5V, 9V, 15V or 20V, respectively. For example, the first Zener diode 631 is formed by a voltage regulator diode with 27V turn-on voltage, and the resistances of the first extended resistor 632 and the second extended resistor 634 are both 200*k* ohms. When the voltage across the auxiliary winding 611 is 12.5V or 22.5V, the output voltage is 5V or 9V correspondingly, and the load state of switching power converter 1 is light. Under this circumstance, the first Zener diode 631 is not conducted, and there is no voltage of the third branch connection node C, accordingly, the auxiliary switch 52 connected to the third branch connection node C is unable to turn on, namely the auxiliary switch 52 is maintained at off state. When the voltage across the auxiliary winding 611 is 37.5V or 50V, the output voltage is 15V or 20V correspondingly, and the load state of switching power converter 1 is heavy. Under this circumstance, the first Zener diode 631 is turned on, there is voltage on the third branch connection node C, and the auxiliary switch 52 connected to the third branch connection node C is turned on. In this embodiment, the second Zener diode 633 is formed by a voltage regulator diode with 6.8V turn-on voltage and is configured to clamp the voltage on the third branch connection node C and to protect the gate of the auxiliary switch 52. Consequently, the control module 6*a* of the switching power converter 1*a* in this embodiment utilizes the voltage provided by the extended branch circuit 63 to control the operation state of the auxiliary switch 52, thereby decreasing the number of ports disposed on the control unit 62*a* and reducing the cost.

Figure 5:
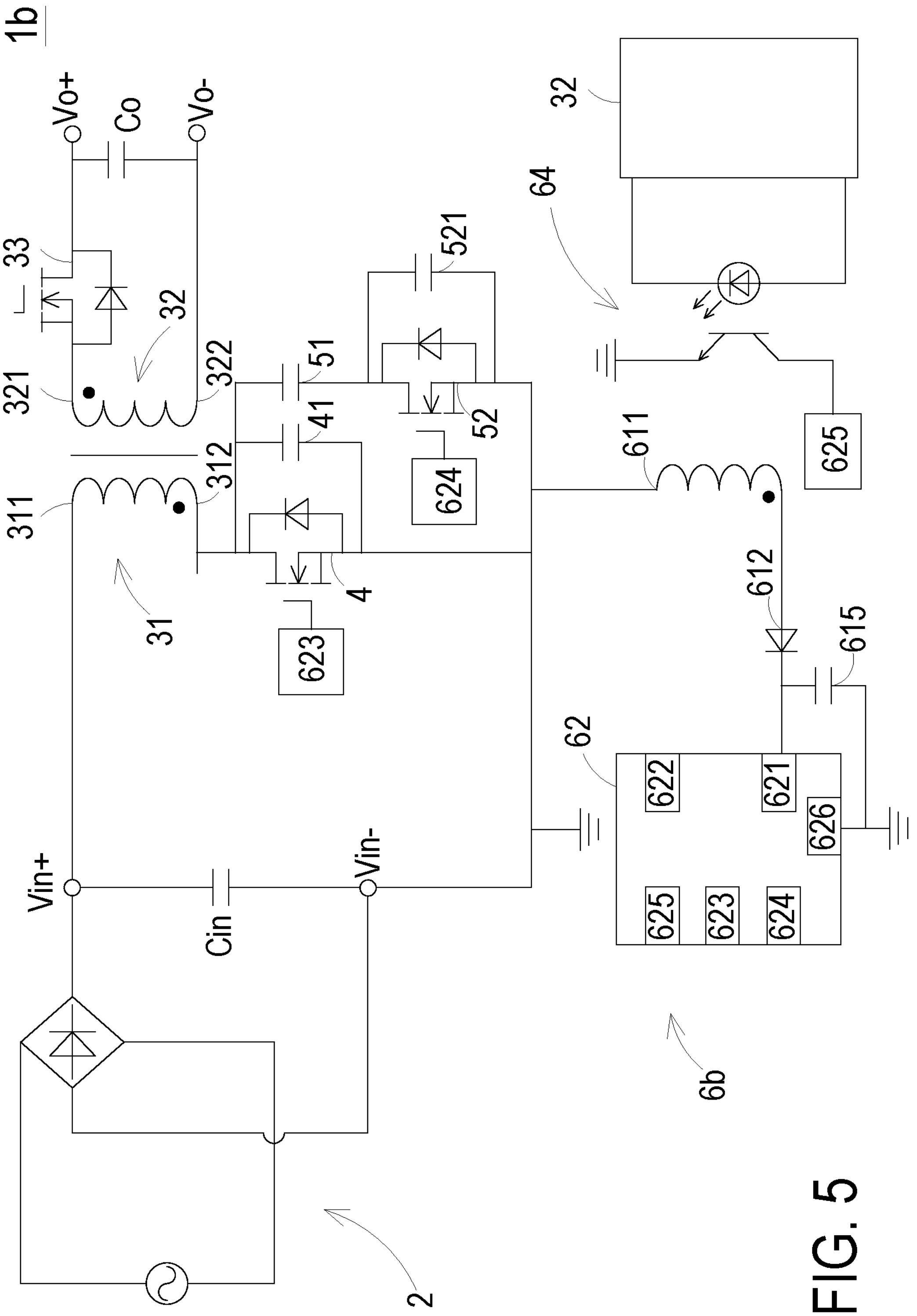
FIG. 5 is a schematic circuit diagram illustrating a switching power converter according to a third embodiment of the present disclosure.

Please refer to FIG. 5. FIG. 5 is a schematic circuit diagram illustrating a switching power converter according to a third embodiment of the present disclosure. As shown in FIG. 5, in this embodiment, the control module 6*b* of the switching power converter 1*b* includes a control unit 62, an auxiliary winding 611, an auxiliary diode 612, an auxiliary capacitor 615 and an optocoupler unit 64. The control unit 62, auxiliary winding 611, auxiliary diode 612 and auxiliary capacitor 615 of the control module 6*b* in this embodiment are similar to that shown in FIG. 3, and thus the detailed descriptions thereof are omitted herein. In this embodiment, the optocoupler unit 64 of the control module 6*b* is connected to the secondary winding 32 of the transformer 3. The optocoupler unit 64 converts the voltage across the secondary winding 32 or the output voltage into a feedback signal through optical coupling and transmits the feedback signal to the feedback signal port 625 of the control unit 62. The control unit 62 determines the load state of switching power converter 1*b* according to information of the feedback signal reflected by the feedback signal port 625, and controls the operation state of the auxiliary switch 52 through the auxiliary switch control port 624. For example, when the voltage represented by the feedback signal is greater than or equal to a fourth voltage threshold (e.g., 2V) and the output power is greater than 60 W, the load state of switching power converter 1*b* is heavy, and the control unit 62 controls the auxiliary switch 52 to turn on through the auxiliary switch control port 624. When the voltage represented by the feedback signal is less than or equal to a fifth voltage threshold (e.g., 1.8V) and the output power is less than 30 W, the load state of switching power converter 1*b* is light, and the control unit 62 controls the auxiliary switch 52 to turn off through the auxiliary switch control port 624. In this embodiment, the fourth voltage threshold is different from the fifth voltage threshold (e.g., by 0.2V in the above example), thus the voltage represented by the feedback signal would not frequently fluctuate between exceeding and falling below a threshold, thereby avoiding frequently switching the auxiliary switch 52.

Figure 6:
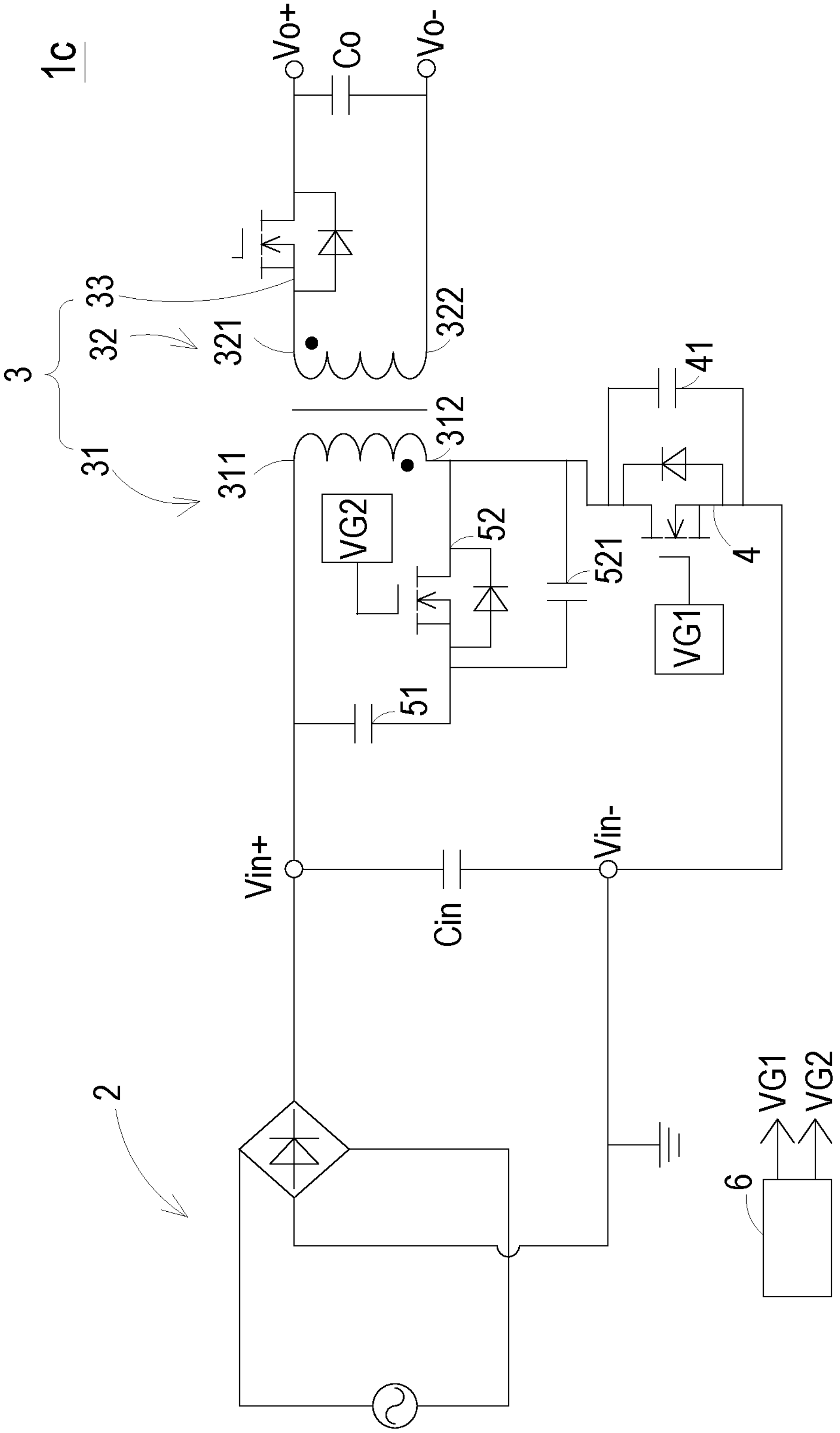
FIG. 6 is a schematic circuit diagram illustrating a switching power converter according to a fourth embodiment of the present disclosure.

Please refer to FIG. 6. FIG. 6 is a schematic circuit diagram illustrating a switching power converter according to a fourth embodiment of the present disclosure. Compared to the switching power converter 1 shown in FIG. 1, in the switching power converter 1*c* of this embodiment, the first terminal of the auxiliary capacitor 51 is electrically connected to the first terminal 311 of the primary winding 31, and the auxiliary switch 52 is electrically connected between the second terminal of the auxiliary capacitor 51 and the second terminal 312 of the primary winding 31. The auxiliary switch 52 has a second parasitic capacitor 521.

Figure 7:
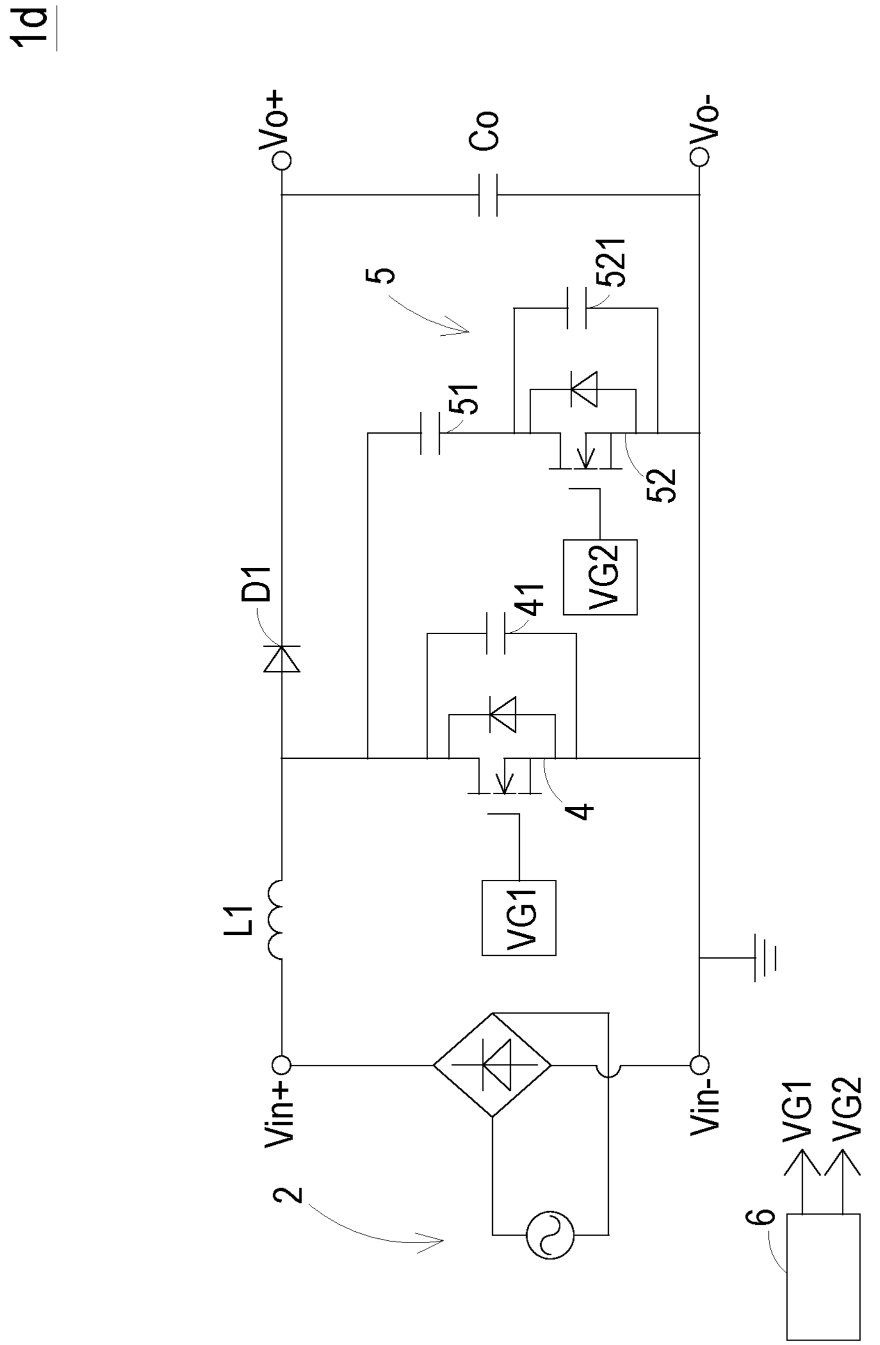
FIG. 7 is a schematic circuit diagram illustrating a switching power converter according to a fifth embodiment of the present disclosure.

Please refer to FIG. 7. FIG. 7 is a schematic circuit diagram illustrating a switching power converter according to a fifth embodiment of the present disclosure. Compared to the switching power converter 1 shown in FIG. 1, the switching power converter Id in this embodiment is a boost circuit and includes a positive input terminal Vin+, a negative input terminal Vin−, a positive output terminal Vo+, a negative output terminal Vo−, an inductor L1, a diode D1, an output capacitor Co, a main switch 4, an auxiliary circuit 5 and a control module 6. The positive input terminal Vin+, negative input terminal Vin−, positive output terminal Vo+, negative output terminal Vo−, output capacitor Co and control module 6 in this embodiment are similar to that shown in FIG. 1, and thus the detailed descriptions thereof are omitted herein. In this embodiment, the first terminal of inductor L1 is electrically connected to the positive input terminal Vin+, the anode of diode D1 is electrically connected to the second terminal of inductor L1, and the cathode of diode D1 is electrically connected to the positive output terminal Vo+. The main switch 4 is electrically connected between the second terminal of inductor L1 and the negative input terminal Vin− and has a first parasitic capacitor 41. The first terminal of the auxiliary capacitor 51 is electrically connected to the connection node between the second terminal of inductor L1 and the anode of diode D1. The auxiliary switch 52 is electrically connected between the second terminal of the auxiliary capacitor 51 and the negative input terminal Vin− and has a second parasitic capacitor 521. Of course, the switching power converter Id in this embodiment may adopt any of the control methods exemplified above, and the detailed descriptions thereof are omitted herein.

Figure 8:
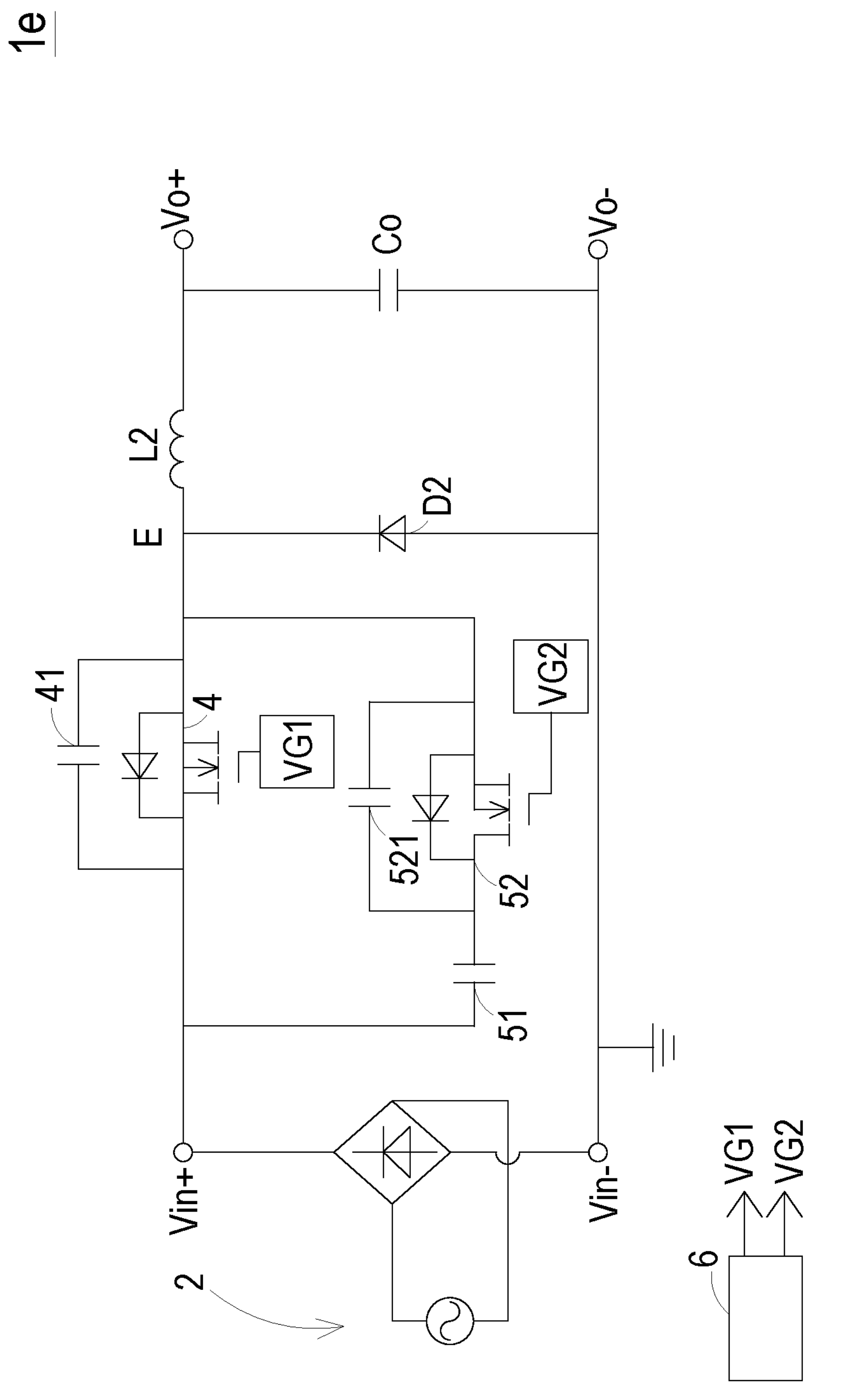
FIG. 8 is a schematic circuit diagram illustrating a switching power converter according to a sixth embodiment of the present disclosure.

Please refer to FIG. 8. FIG. 8 is a schematic circuit diagram illustrating a switching power converter according to a sixth embodiment of the present disclosure. Compared to the switching power converter 1 shown in FIG. 1, the switching power converter 1*e* in this embodiment is a buck conversion circuit and includes a positive input terminal Vin+, a negative input terminal Vin−, a positive output terminal Vo+, a negative output terminal Vo−, an inductor L2, a diode D2, an output capacitor Co, a main switch 4, an auxiliary circuit 5 and a control module 6. The positive input terminal Vin+, negative input terminal Vin−, positive output terminal Vo+, negative output terminal Vo−, output capacitor Co and control module 6 in this embodiment are similar to that shown in FIG. 1, and thus the detailed descriptions thereof are omitted herein. In this embodiment, the main switch 4 is electrically connected to the positive input terminal Vin+ and has a first parasitic capacitor 41. The inductor L2 is electrically connected between the main switch 4 and the positive output terminal Vo+, and a junction node E connecting the inductor L2 and the main switch 4 is formed. The auxiliary capacitor 51 is electrically connected to the positive input terminal Vin+. The auxiliary switch 52 is electrically connected between the auxiliary capacitor 51 and the junction node E. The diode D2 is electrically connected between the junction node E and the negative output terminal Vo−, and the cathode and anode of the diode D2 are electrically connected to the junction node E and the negative output terminal Vo− respectively. Of course, the switching power converter 1*e* in this embodiment may adopt any of the control methods exemplified above, and the detailed descriptions thereof are omitted herein.

In summary, in the present disclosure, the switching power converter includes a main switch and an auxiliary circuit, and the auxiliary circuit includes an auxiliary switch and an auxiliary capacitor. When the load state of the switching power converter is light, a control module controls the auxiliary switch to turn off, so as to maintain a capacitance of a first equivalent capacitor between a drain and a source of the main switch at a low threshold. When the load state of the switching power converter is heavy, the control module controls the auxiliary switch to turn on, so as to maintain the capacitance of the first equivalent capacitor between the drain and source of the main switch at a high threshold. In the present disclosure, the switching power converter suppresses the radiated electromagnetic interference under heavy load through disposing the auxiliary capacitor. When the switching power converter works under light load, the auxiliary switch is turned off to reduce the capacitance of the first equivalent capacitor between the drain and source of the main switch. In specific, when the switching power converter works under light load, the capacitance of the first equivalent capacitor is only the sum of the capacitances of first and parasitic capacitors, which is much smaller than the capacitance of the auxiliary capacitor. Therefore, for the overall switching power converter, the average efficiency is improved, and the losses are reduced. In other words, the switching power converter of the present disclosure realizes the technical effects of suppressing the radiated electromagnetic interference and improving the average efficiency.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A switching power converter, comprising:

a main switch;

an auxiliary circuit, electrically connected in parallel to the main switch, wherein the auxiliary circuit comprises an auxiliary switch and an auxiliary capacitor electrically connected in series; and a control module, configured to detect a load state of the switching power converter and control an operation state of the auxiliary switch according to the load state, wherein when the load state of the switching power converter is light, the control module controls the auxiliary switch to turn off so that a capacitance of a first equivalent capacitor between a drain and a source of the main switch is maintained at a first threshold, and when the load state of the switching power converter is heavy, the control module controls the auxiliary switch to turn on so that the capacitance of the first equivalent capacitor is maintained at a second threshold, and the second threshold is higher than the first threshold;

wherein the switching power converter is a flyback conversion circuit, and the switching power converter further comprises:

a positive input terminal and a negative input terminal, wherein the positive input terminal and the negative input terminal are configured to receive an input power;

a positive output terminal and a negative output terminal, wherein the positive output terminal and the negative output terminal are configured to provide an output voltage;

a transformer comprising a primary winding and a secondary winding magnetically coupled to each other, wherein a first terminal of the primary winding is electrically connected to the positive input terminal, two terminals of the secondary winding are electrically connected to the positive output terminal and the negative output terminal respectively;

the main switch, electrically connected between a second terminal of the primary winding of the transformer and the negative input terminal, wherein the main switch has a first parasitic capacitor;

the auxiliary capacitor, electrically connected to the second terminal of the primary winding; and the auxiliary switch electrically connected between the auxiliary capacitor and the negative input terminal, wherein the auxiliary switch has a second parasitic capacitor, wherein the control module comprises a control unit, an auxiliary winding, an auxiliary diode and an extended branch circuit, the control unit comprises a first port, a second port and a third port, wherein the control unit reflects information of the output voltage through the first port, the control unit reflects information of a voltage across the auxiliary winding through the second port, and the control unit controls an operation state of the main switch through the third port wherein the auxiliary winding and the auxiliary diode are electrically connected in series between the negative input terminal and the first port, the extended branch circuit comprises a first Zener diode, a first extended resistor, a second Zener diode and a second extended resistor, and the first Zener diode, the first extended resistor and the second Zener diode are electrically connected in series between the first port and the negative input terminal sequentially, the second extended resistor is electrically connected in parallel to the second Zener diode, the first extended resistor and the second Zener diode are electrically connected to a third branch connection node, and the third branch connection node is connected to the auxiliary switch for controlling the operation state of the auxiliary switch.

2. The switching power converter according to claim 1, wherein when the load state of the switching power converter is light, the capacitance of the first equivalent capacitor is a sum of a capacitance of the first parasitic capacitor of the main switch and a capacitance of the second parasitic capacitor of the auxiliary switch; and when the load state of the switching power converter is heavy, the capacitance of the first equivalent capacitor is a sum of the capacitance of the first parasitic capacitor of the main switch and a capacitance of the auxiliary capacitor.

3. The switching power converter according to claim 1, wherein a capacitance of the first parasitic capacitor of the main switch is greater than or equal to a capacitance of the second parasitic capacitor of the auxiliary switch.

4. The switching power converter according to claim 1, wherein a capacitance of the auxiliary capacitor is greater than or equal to a capacitance of the second parasitic capacitor of the auxiliary switch.

5. A control method of a switching power converter, comprising:

providing a switching power converter, wherein the switching power converter comprises a main switch, an auxiliary circuit electrically connected in parallel to the main switch, and a control module, the auxiliary circuit comprises an auxiliary switch and an auxiliary capacitor, and the auxiliary switch and the auxiliary capacitor are electrically connected in series; and detecting a load state of the switching power converter, wherein when the load state of the switching power converter is light, the auxiliary switch is controlled to turn off for maintaining a capacitance of a first equivalent capacitor at a first threshold, the first equivalent capacitor is between a drain and a source of the main switch, when the load state of the switching power converter is heavy, the auxiliary switch is controlled to turn on for maintaining the capacitance of the first equivalent capacitor at a second threshold, and the second threshold is higher than the first threshold;

wherein the switching power converter is a flyback conversion circuit, and the switching power converter further comprises:

a positive input terminal and a negative input terminal, wherein the positive input terminal and the negative input terminal are configured to receive an input power;

a positive output terminal and a negative output terminal, wherein the positive output terminal and the negative output terminal are configured to provide an output voltage;

a transformer comprising a primary winding and a secondary winding magnetically coupled to each other, wherein a first terminal of the primary winding is electrically connected to the positive input terminal, two terminals of the secondary winding are electrically connected to the positive output terminal and the negative output terminal respectively;

the main switch, electrically connected between a second terminal of the primary winding of the transformer and the negative input terminal, wherein the main switch has a first parasitic capacitor;

the auxiliary capacitor, electrically connected to the second terminal of the primary winding; and the auxiliary switch electrically connected between the auxiliary capacitor and the negative input terminal, wherein the auxiliary switch has a second parasitic capacitor, wherein the control module comprises a control unit, an auxiliary winding, an auxiliary diode and an extended branch circuit, the control unit comprises a first port, a second port and a third port, wherein the control method further comprises:

reflecting information of the output voltage through the first port by the control unit, reflecting information of a voltage across the auxiliary winding through the second port by the control unit, and controlling an operation state of the main switch through the third port by the control unit, wherein the auxiliary winding and the auxiliary diode are electrically connected in series between the negative input terminal and the first port, the extended branch circuit comprises a first Zener diode, a first extended resistor, a second Zener diode and a second extended resistor, and the first Zener diode, the first extended resistor and the second Zener diode are electrically connected in series between the first port and the negative input terminal sequentially, the second extended resistor is electrically connected in parallel to the second Zener diode, the first extended resistor and the second Zener diode are electrically connected to a third branch connection node, and the third branch connection node is connected to the auxiliary switch for controlling the operation state of the auxiliary switch.

* * * * *